May 18, 1926.

W. KIRKPATRICK

RIDGE BUSTER ATTACHMENT

Filed April 24, 1924

1,585,292

Inventor
W. Kirkpatrick

By Clarence A. O'Brien
Attorney

Patented May 18, 1926.

1,585,292

UNITED STATES PATENT OFFICE.

WALTER KIRKPATRICK, OF HUTCHINSON, KANSAS.

RIDGE-BUSTER ATTACHMENT.

Application filed April 24, 1924. Serial No. 708,749.

This invention relates to ridge buster attachments and more particularly to an improvement adapted to be secured to a ridge buster for operation to break a ridge and to distribute the dirt more evenly, in the cultivating operation.

An object of the invention resides in providing a ridge buster attachment adapted for breaking ridges and distributing dirt more evenly in the cultivating operation, and which includes a frame member adapted for attachment with a ridge buster carrying a pair of arms mounting digger elements arranged to break and throw dirt outwardly therefrom in opposite directions.

Another object of the invention is to provide a ridge buster attachment including a frame adapted for attachment to a ridge buster provided with a pair of diverging arms mounting rotatable disc elements in angular relation to one another for breaking a ridge and throwing the dirt outwardly therefrom for even distribution in the rear of the ridge buster.

The invention includes other objects and improvements in the details of the construction and the arrangement of the parts which are more particularly pointed out in the following description and claim directed to a preferred form of the invention, it being understood, however, that variations may be made in the specific construction and mounting of the parts with relation to each other, without departing from the scope of the invention as described and claimed.

In the drawing, forming a part of this application:

Figure 1:
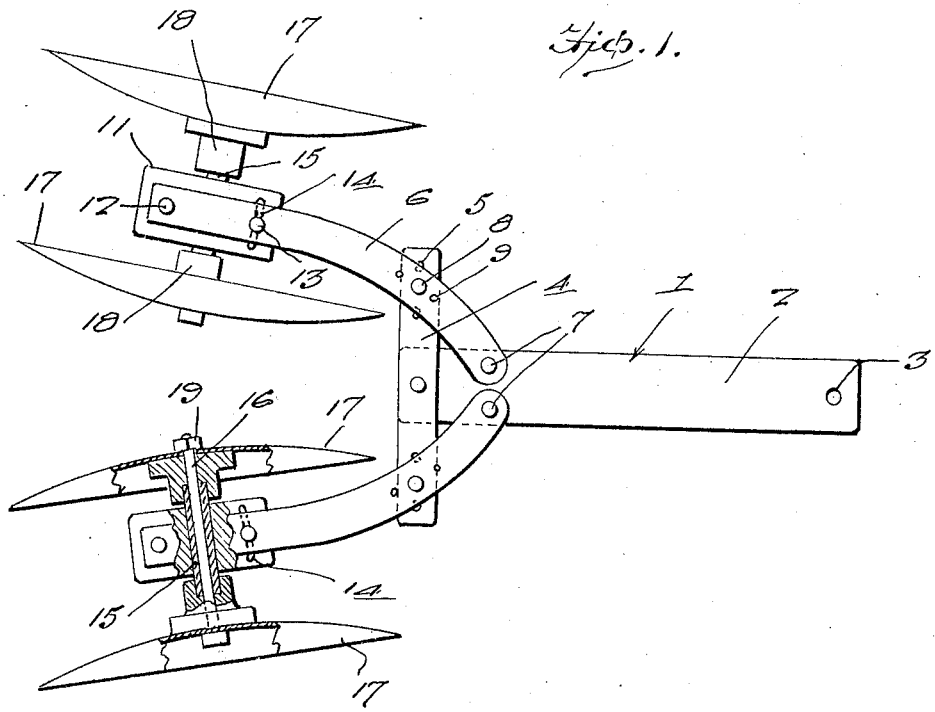
Figure 1 is a plan view of the attachment, forming the subject of this invention, portions being shown in section.
Figure 2:
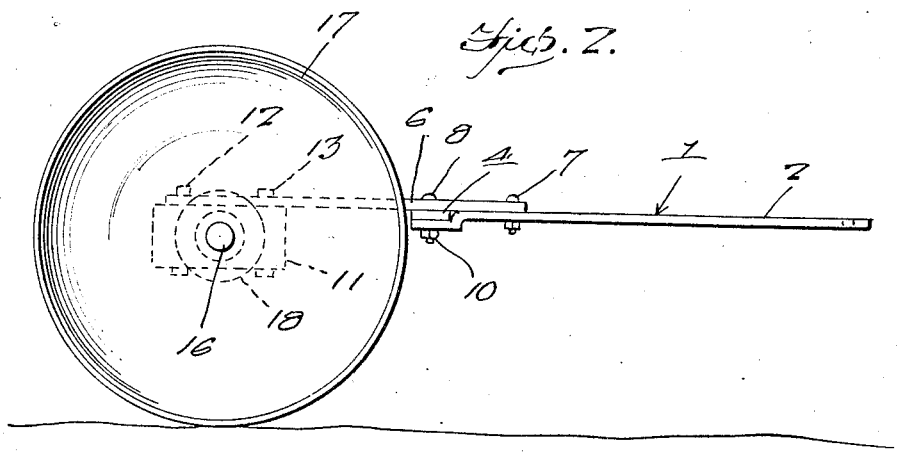
Figure 2 is a side elevation thereof.

The reference numeral 1 indicates the frame of the attachment, which essentially comprises a draw bar 2, provided at the forward end with an opening 3, by which the draw bar may be attached to the ridge buster.

The rear end of the draw bar 2 is provided with a cross arm 4, secured intermediate its ends to said draw bar, and provided in the free end portions with a plurality of spaced openings 5. A pair of supporting arms 6 are pivotally connected to the draw bar 2 at 7, in adjacent spaced relation and forwardly of the cross arm 4, and are adjustably connected to the cross arm 4 by pins 8, adapted for insertion through holes in the cross arm indicated at 5, and one of the openings 9 in the supporting arm. Through these pin connections 8, it will be seen that the supporting arm 6 may be adjusted to any one of a number of desired angular relations to the draw bar 2, after which nuts 10 may be applied to the threaded ends of said stems or bolts, for securing said supporting arms and cross bar in rigid relation with each other.

Bearing blocks 11 are pivotally mounted on the rear ends of the supporting arms 6 on pivot bolts 12, and are limited in this pivotal movement by bolts 13 extending through the openings in arms 6 and slots 14 formed in the bearing blocks, the bolts 13 being tightened to secure said bearing blocks in a desired position of adjustment on said arms. Each bearing block is provided with a bearing sleeve 15 for rotatably receiving the shaft 16 extending beyond the ends of said sleeves and mounting discs 17. Bearing heads 18 are mounted on the ends of the bearing sleeves 15 for rotation thereon, and adapted to have the discs 17 secured against the ends thereof by the shaft 16 which is provided with a head at one end and threadedly receives a nut 19 at the other end in order to provide a rigid bearing for said disc adapted to distribute thrust along the length of the bearing sleeve 15.

From the foregoing description, it will be readily seen that when a ridge buster attachment, constructed as above described, is pulled along in operative relation behind the ridge buster and the arms adjusted in angular relation as shown, the discs can be made to rise on a ridge of dirt being harrowed for breaking up said ridge and distributing the dirt outwardly in opposite directions therefrom over the surface of the ground, for aiding in levelling the ground during the cultivating operation.

It will also be seen that a simple construction for mounting the discs has been provided and that adjustable bearings provided with bearing sleeves adapted to give a large bearing surface for the pairs of discs, and for efficiently absorbing end thrust and twists caused in the operation of said discs at an angle such as that illustrated.

What is claimed is:

In an attachment of the class described, a draw bar having an angular offset portion, a cross arm mounted intermediate its ends on the upper surface of the offset portion, said cross arm being in the same plane as the draw bar, a pair of supporting arms pivotally mounted on the upper surface of said draw bar forwardly of said cross arm and extending to rest on the cross arm, means associated with the supporting arms and the cross arm so as to allow the independent adjustment of the supporting arms in angular relation to each other, bearing blocks on the rear ends of said supporting arms, and a disk element rotatably mounted on each bearing block.

In testimony whereof I affix my signature.

WALTER KIRKPATRICK.